United States Patent
Kim et al.

(10) Patent No.: US 7,504,029 B2
(45) Date of Patent: Mar. 17, 2009

(54) SILICA GEL BONDED WITH CUCURBITURIL

(75) Inventors: Kimoon Kim, Pohang (KR); Rengarajan Balaji, Pohang (KR); Dong Hyun Oh, Pohang (KR); Young Ho Ko, Pohang (KR); Sang Yong Jon, Pohang (KR)

(73) Assignee: Postech Foundation, Pohang, Kyungsangbuk-do (KR)

( * ) Notice: Subject to any disclaimer, the term of this patent is extended or adjusted under 35 U.S.C. 154(b) by 325 days.

(21) Appl. No.: 10/544,850

(22) PCT Filed: Feb. 11, 2004

(86) PCT No.: PCT/KR2004/000272

§ 371 (c)(1),
(2), (4) Date: Aug. 8, 2005

(87) PCT Pub. No.: WO2004/072151

PCT Pub. Date: Aug. 26, 2004

(65) Prior Publication Data

US 2006/0207938 A1    Sep. 21, 2006

(30) Foreign Application Priority Data

Feb. 11, 2003  (KR) .................... 10-2003-0008453

(51) Int. Cl.
*B01D 15/08* (2006.01)

(52) U.S. Cl. ............. 210/198.2; 210/635; 210/656; 210/502.1

(58) Field of Classification Search .............. 210/198.2, 210/635, 656, 502.1
See application file for complete search history.

(56) References Cited

U.S. PATENT DOCUMENTS

| 4,177,038 | A | * | 12/1979 | Biebricher et al. ............. 8/192 |
| 4,275,300 | A | * | 6/1981 | Abbott ....................... 250/304 |
| 4,431,544 | A | * | 2/1984 | Atkinson et al. ............ 210/635 |
| 4,539,399 | A | | 9/1985 | Armstrong |
| 4,540,486 | A | * | 9/1985 | Ramsden .................. 210/198.2 |
| 6,251,278 | B1 | * | 6/2001 | Hammen ..................... 210/635 |
| 2004/0129640 | A9 | * | 7/2004 | Ng et al. ..................... 210/656 |
| 2004/0147396 | A1 | * | 7/2004 | Richter et al. ............... 502/401 |

FOREIGN PATENT DOCUMENTS

| EP | 1094065 A2 | 4/2001 |
| EP | 1210966 A1 | 6/2002 |

(Continued)

OTHER PUBLICATIONS

Clennan et al., "Additions of Singlet Oxygen to Alkoxy-Substituted Butadienes. An Unexpectedly Large s-Cis/s-Trans Ratio in an (E,Z)-Diene or a Kinetic Anomeric Effect?" Journal of Organic Chemistry, 1986, vol. 51, pp. 1440-1446.

(Continued)

*Primary Examiner*—Ernest G Therkom
(74) *Attorney, Agent, or Firm*—Rothwell, Figg, Ernst & Manbeck

(57) ABSTRACT

A cucurbituril-bonded silica gel and its use are provided. The cucurbituril-bonded silica gel is useful for removal of air pollutants or water contaminants, and separation and purification of biological, organic, inorganic, or ionic substances.

3 Claims, 1 Drawing Sheet

FOREIGN PATENT DOCUMENTS

| | | |
|---|---|---|
| JP | 11-217557 | 8/1999 |
| JP | 2001-122877 | 5/2001 |
| JP | 2001-146690 | 5/2001 |
| KR | 100263872 B1 | 5/2000 |
| KR | 1020010039662 A | 5/2001 |
| KR | 1020030003901 A | 1/2003 |
| KR | 1020030024426 A | 3/2003 |
| KR | 1020030060053 A | 7/2003 |
| WO | 00/68232 A1 | 11/2000 |
| WO | 02/096553 A2 | 12/2002 |
| WO | WO/02/096553 * | 12/2002 |

OTHER PUBLICATIONS

Kellersberger, et al., "Encapsulation of N2, O2, Methanol, or Acetonitrile by Decamethylcucurbit[5]uril(NH4+)2 Complexes in the Gas Phase: Influence of the Guest on "Lid" Tightness." Journal of American Chemical Society, 2001, 123, pp. 11316-11317.

Rosini, C. et al., "Cinchona Alkaloids for Preparing New, Easily Accessible Chiral Stationary Phases.I.11-(10,11-Dihydro-6'-Methoxy-Cinchonan-9-OL)-Tiopropylsilanized Silica." Tetrahedron Letters, 1985, vol. 26, No. 28, pp. 3361-3364.

Hargitai et al., "Preparation and Chromatographic Evaluation of 3.5-dimethylphenyl Carbamoylated Beta-Cyclodextrim Stationary Phases for Normal-Phase High-Performance Liquid Chromatographic Separation of Enantiomers," Journal of Chromatography, 1993, vol. 628, pp. 11-22.

Buschmann et al. "The Selective Removal of Dyes from Waste Water"Eur. Water Pollut. Control, vol. 6, No. 4, pp. 21-24 (1996).

Office Action dated Sep. 24, 2008 issued in connection with Japanese counterpart application 2006-500645.

* cited by examiner

SILICA GEL BONDED WITH CUCURBITURIL

CROSS REFERENCE TO RELATED APPLICATION

This application is a 35 U.S.C. § 371 National Phase Entry Application from PCT/KR2004/000272, filed Feb. 11, 2004, and designating the U.S.

1. Field of the Invention

The present invention relates to a cucurbituril-bonded silica gel. More particularly, the present invention relates to a silica gel covalently bonded to cucurbituril that is useful for removal of air pollutants or water contaminants, and separation and purification of biological, organic, inorganic, or ionic substances, and a method for preparing the same.

2. Description of the Related Art

Generally, a column packing material is a material that is used as a stationary phase upon separation and purification of various test samples. Various column packing materials in which various compounds are bonded to silica gels have been developed as stationary phases. Crown ether (Korean Patent No. 0263872) and cyclodextrin (U.S. Pat. No. 4,539,399) are known as a representative material bonded to a silica gel. A silica gel bonded with crown ether or cyclodextrin is used as a stationary phase in separation of various test samples by selective noncovalent interactions with various organic or ionic compounds.

Like cyclodextrin, it is known that cucurbituril has retention capacity for various compounds due to the presence of hydrophilic and hydrophobic cavities. However, unlike cyclodextrin, cucurbituril has carbonyl groups on the entrance of the cavities, and thus, can retain various ionic compounds and high polarity compounds by charge-polarity interactions, polarity-polarity interactions, or hydrogen bonds. Therefore, cucurbituril has retention capacity for various compounds, for example, organic compounds such as gaseous compounds, aliphatic compounds, and aromatic compounds, insecticides, herbicides, amino acids, nucleic acids, ionic compounds, metal ions, or organic metal ions (J. Am. Chem. Soc. 2001, 123, 11316; European Patent No. 1094065; J. Org. Chem. 1986, 51, 1440).

Horst Group (European Patent No. 1210966 A1) reported that a mixture of cucurbituril, cyclodextrin, and the like could be used for gas filters of air conditioners and filters of vacuum cleaners. In this case, however, separation of contaminants from cucurbituril and cyclodextrin is difficult, which renders recycling of filters difficult.

With respect to use of cucurbituril or cyclodextrin for common separation and purification, a mixture of cucurbituril or cyclodextrin with a test sample to be separated and purified is introduced into a mobile phase. In this case, since cucurbituril or cyclodextrin retaining contaminants is dissolved in the mobile phase, a complicated separation process of cucurbituril or cyclodextrin from the mobile phase is required.

In this regard, there is required a novel compound that has insolubility of cucurbituril and cyclodextrin in a mobile phase and excellent selective separation capacity for various test samples.

SUMMARY OF THE INVENTION

The present invention provides a cucurbituril-bonded silica gel.

The present invention also provides a cucurbituril- and cyclodextrin-bonded silica gel.

The present invention also provides a column packing material or a filter comprising the cucurbituril-bonded silica gel.

The present invention also provides a use of the column packing material or the filter.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
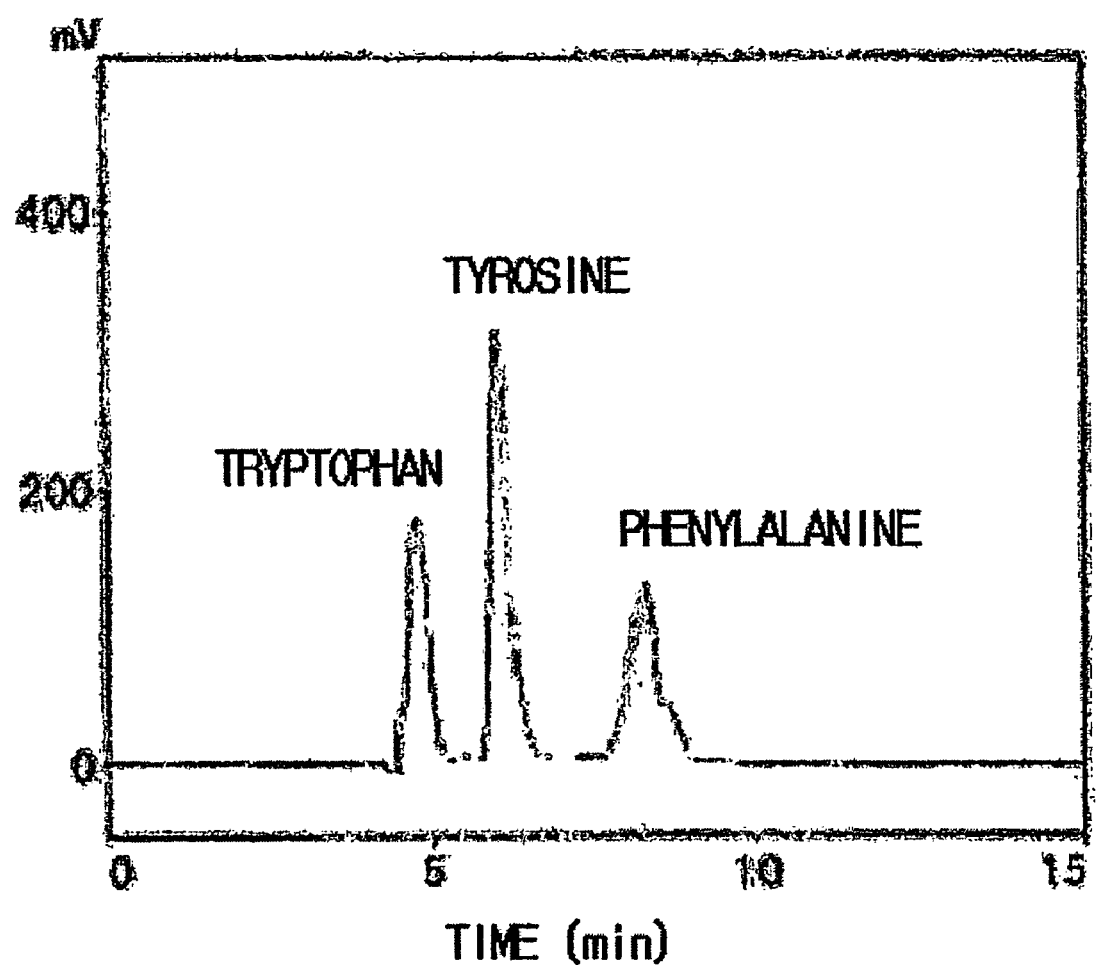
FIG. 1 shows separation results for amino acids according to Application Example 1 of the present invention.

According to an aspect of the present invention, there is provided a cucurbituril-bonded silica gel in which a cucurbituril of Formula 1 is bonded to a modified silica gel of Formula 2:

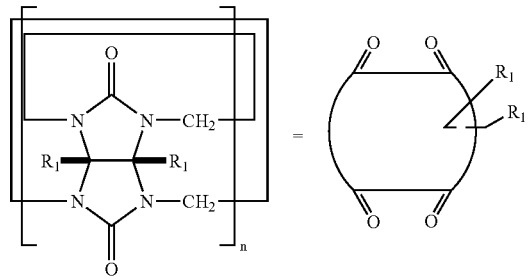

Formula 1 wherein n is an integer of 4 to 20, and each $R_1$ is independently an alkenyloxy group of C2-C20 with a unsaturated bond end, a carboxyalkylsulfanyloxy group in which the alkyl moiety has C1-C20, a carboxyalkyloxy group in which the alkyl moiety has C1-C20, an aminoalkyloxy group in which the alkyl moiety has C1-C20, or a hydroxyalkyloxy group in which the alkyl moiety has C1-C20, and

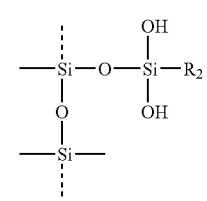

Formula 2 wherein $R_2$ is but not limited to an alkylthiol group in which the alkyl moiety has C2-C10, an alkylamine group in which the alkyl moiety has C2-C10, an epoxyalkyloxyalkyl group in which the alkyl moiety has C2-C10, an alkyl isocyanate group in which the alkyl moiety has C2-C10, or an alkyl isothiocyanate group in which the alkyl moiety has C2-C10.

According to another aspect of the present invention, there is provided a cucurbituril-bonded silica gel obtained by bonding the cucurbituril of Formula 1 above with a silane compound of Formula 3 below, followed by bonding to a silica gel of Formula 2a below:

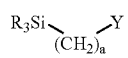

Formula 3 wherein Y is but not limited to a thiol group, an amino group, an epoxy group, an isocyanate group, or an isothiocyanate group, a is an integer of 1 to 10, R is an alkoxy group of C1-C10, an alkyl group of C1-C10, or a halogen atom, and

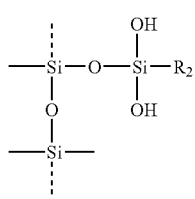

Formula 2a wherein $R_2$ is OH.

According to another aspect of the present invention, there is provided a cucurbituril- and cyclodextrin-bonded silica gel in which the cucurbituril derivative of Formula 1 above and cyclodextrin of Formula 8 below are bonded to the modified silica gel of Formula 2 above:

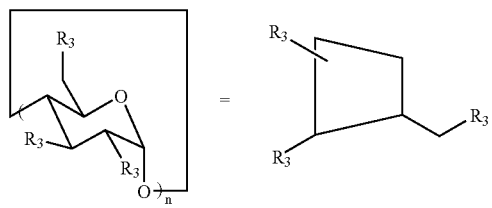

Formula 8 wherein $R_3$ is a hydroxy group or an alkenyloxy group with a substituted or unsubstituted alkenyl moiety of C1-C20, and k is an integer of 6 to 8.

According to still another aspect of the present invention, there is provided a column packing material or a filter including the cucurbituril- or cucurbituril- and cyclodextrin-bonded silica gel.

According to yet another aspect of the present invention, there is provided a use of the column packing material or the filter in separation of hydrophilic amino acids, alkaloids, proteins, nucleic acids, optically or non-optically active asymmetrical substances, drugs, ionic substances, amines, or gaseous compounds.

Hereinafter, the present invention will be described in more detail.

According to the present invention, a cucurbituril derivative represented by Formula 1 below with an appropriate functional group is used to covalently bonded to a silica gel:

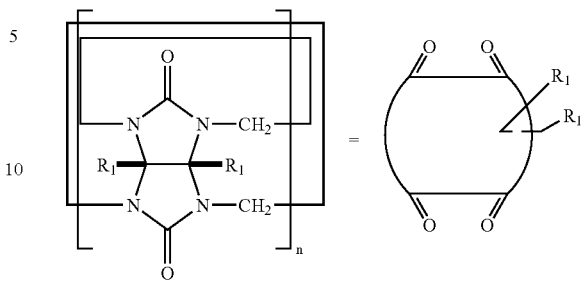

Formula 1 wherein n is an integer of 4 to 20, in particular, an integer of 5 to 8, and each $R_1$ is independently an alkenyloxy group of C2-C20 with a unsaturated bond end, a carboxyalkylsulfanyloxy group in which the alkyl moiety has C1-C20, a carboxyalkyloxy group in which the alkyl moiety has C1-C20, an aminoalkyloxy group in which the alkyl moiety has C1-C20, in particular, C1-C8, or a hydroxyalkyloxy group in which the alkyl moiety has C1-C20, in particular, C1-C8.

In Formula 1, the right-side formula is a simplified structural formula of the corresponding left-side formula. Although only two R1 are represented in Formula 1, the number of $R_1$ increases correspondingly to n. For example, when n is 6, the total number of $R_1$ is equal to 12.

In Formula 1, the alkenyloxy group of C2-C20 with a unsaturated bond end may be an allyloxy group or a propylenyloxy group, the carboxyalkylsulfanyloxy group may be 3-carboxyethylsulfanylpropyloxy group or 3-carboxybutylsulfanylpropyloxy group, the carboxyalkyloxy group may be 2-carboxyethyloxy group or 4-carboxybutyloxy group, the aminoalkyloxy group may be 2-aminoethyloxy group or 4-aminobutyloxy group, and the hydroxyalkyloxy group may be 2-hydroxyethyloxy group or 3-hydroxypropyloxy group.

A hydroxycucurbituril or its mother cucurbituril is used as a synthetic material for the curcurbituril derivative of Formula 1 above. Examples of hydroxycucurbiturils and cucurbiturils are disclosed together with their structural formulae and synthetic methods in Korean Patent Application Nos. 02-68362, 02-318, 01-57573, 01-39756, and 00-33026, filed by the present applicants, the disclosures of which are incorporated herein by reference in their entireties.

The cucurbituril derivative of Formula 1 is covalently bonded to a silica gel of Formula 2 below end-modified by one of various functional groups to obtain a desired compound:

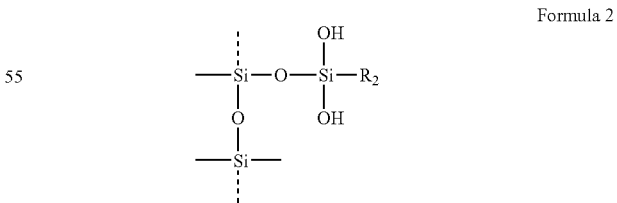

Formula 2 wherein $R_2$ may be any one of various functional groups according to a desired purpose, and preferably, is an alkylthiol group in which the alkyl moiety has C2-C10, in particular, C3-C8, an alkylamine group in which the alkyl moiety has C2-C10, in particular, C3-C8, an epoxyalkyloxyalkyl group in which the alkyl moiety has C2-C10, in particular, C3-C8, an alkyl isocyanate group in which the alkyl moiety has C2-C10, in particular, C3-C8, or an alkyl isothiocyanate group in which the alkyl moiety has C2-C10, in particular, C3-C8.

The alkylthiol group in which the alkyl moiety has C2-C10 may be a 3-mercaptopropyl group or a 5-mercaptopentyl group, the alkylamine group in which the alkyl moiety has C2-C10 may be a 3-aminopropyl group or a 5-aminopentyl group, the epoxyalkyloxyalkyl group in which the alky moiety has C2-C10 may be a glycidoxypropyl group, the alkyl isocyanate group in which the alkyl moiety has C2-C10 may be a 3-isocyanato-propyl group or a 5-isocyanato-pentyl group, and the alkyl isothiocyanate group in which the alkyl moiety has C3-C8 may be a 3-[3-(4-isothiocyanato-phenyl)-thioureido]-propyl group.

The modified silica gel of Formula 2 above may be prepared by a known synthetic method (U.S. Pat. No. 4,539,399; J. Chromatogr. 628(1993) 11; Tetrahedron Lett. 26(1985) 3361).

For example, the modified silica gel of Formula 2 may be synthesized by reacting a silane having an end functional group such as thiol, amine, and epoxy group(s) with an uncoated silica gel used for column purification.

A cucurbituril-bonded silica gel of the present invention can be synthesized by covalently bonding the cucurbituril derivative of Formula 1 with the modified silica gel of Formula 2. That is, the cucurbituril derivative of Formula 1 is covalently bonded to the modified silica gel of Formula 2 by reacting an end functional group of $R_1$ of the cucurbituril derivative such as carboxy group, an amino group, a hydroxy group, or an allyl group with an end functional group of $R_2$ of the modified silica gel such as an amino group, an epoxy group, or a thiol group.

The present invention also provides a cucurbituril-bonded silica gel obtained by bonding the cucurbituril derivative of Formula 1 above with the silane compound of Formula 3 below, followed by bonding to the silica gel of Formula 2a:

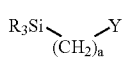

Formula 3 wherein Y is a thiol group, an amino group, an epoxy group, an isocyanate group, or an isothiocyanate group, a is an integer of 1 to 10, in particular, an integer of 3 to 8, R is an alkoxy group of C1-C10, an alkyl group of C1-C10, or a halogen atom.

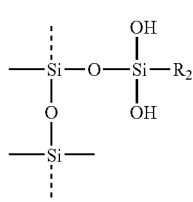

(2a)

wherein $R_2$ is OH.

The alkoxy group may be a methoxy group or an ethoxy group, the alkyl group may be a methyl group or an ethyl group, and the halogen atom may be Cl.

Examples of the silane compound of Formula 3 above include 3-mercaptopropyltrimethoxysilane, 3-aminopropyl-triethoxysilane, and 3-glycidoxypropyltriethoxysilane.

A cucurbituril-bonded silica gel of the present invention may be selected from compounds of Formulae 4a, 4b, 5a, 5b, 6a, 6b, 7a, 7b, 8a, 8b, 9a, 9b, 10a, and 10b below and their synthetic methods will now be described.

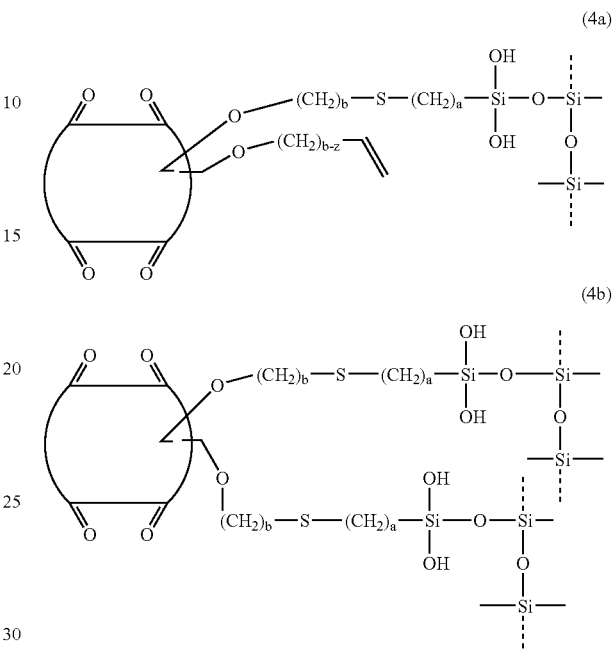

wherein a is an integer of 1 to 10, in particular, an integer of 3 to 8, and b is an integer of 2 to 20, in particular, 2 to 8.

The compounds of Formulae 4a and 4b may be obtained by sulfido-bond formation between a cucurbituril derivative and a silica gel, in detail, by radical reaction between a thiol-modified silica gel and alkenyloxycucurbituril of Formula 1 where $R_1$ is an alkenyloxy group of C2-C8. Alkenyl moieties of the alkenyloxy groups in the alkenyloxycucurbituril may partially or wholly anticipate in the radical reaction. The former case is represented in Formula 4a and the latter case is represented in Formula 4b.

The preparation of the compound of Formulae 4a or 4b by radical reaction includes, but is not limited to, the steps of (a) dissolving alkenyloxycucurbituril in an organic solvent such as chloroform and methanol; (b) adding a catalytic amount of AIBN (2,2-azobisisobutyronitrile) to the reaction mixture and then placing the resultant reaction mixture in a crystal tube; (c) adding a thiol-modified silica gel to the reaction mixture; (d) removing residual oxygen by the supply of nitrogen or argon to the reaction mixture; (e) exposing the reaction mixture to ultraviolet light for several days, for example, 3 days; and (f) washing the resultant solution with excess organic solvent followed by filtration to obtain a silica gel linked with cucurbituril by a sulfido-bond.

The exposure to ultraviolet light in step (e) may be substituted by heating at 80 to 120° C.

The compound of Formula 4a or 4b may also be prepared as the following method.

3-mercaptopropyltrimethoxysilane of Formula 3 where R is a methoxy group, a is 3, and Y is SH reacts with alkenyloxycucurbituril of Formula 1 where $R_1$ is an alkenyloxy group of C2-C8 by a radical reaction to form a silane-bonded cucurbituril via a sulfido-bond. The silane-bonded cucurbituril is mixed with a silica gel of Formula 2a and heated in an organic solvent to prepare a silica gel linked with cucurbituril by a sulfido-bond of Formula 4a or 4b. The organic solvent may be selected from various solvents such as benzene, toluene, and xylene and the heating temperature may be selected from 100 to 150° C. according to the type of the organic solvent.

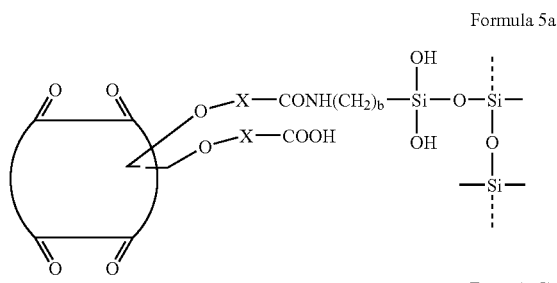

Formula 5a

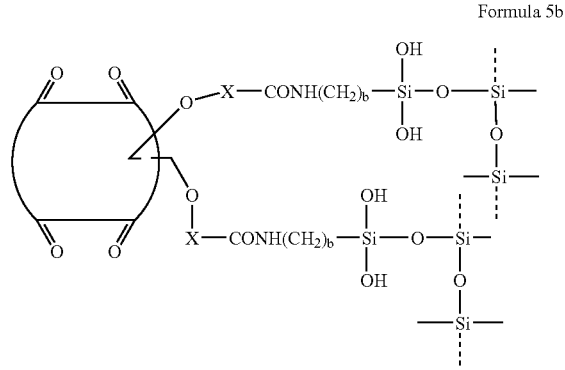

Formula 5b wherein b is an integer of 2 to 20, in particular, an integer of 2 to 8, X is an alkylsulfidoalkyl group with a substituted or unsubstituted alkyl moiety of C2-C20.

The compounds of Formulae 5a and 5b may be prepared by amide bond formation between a cucurbituril derivative and a silica gel, in detail, by amide bond formation between carboxyalkyloxycucurbituril of Formula 1 where $R_1$ is a carboxy-ended alkyloxy group of C2-C20 and an amino-modified silica gel. The carboxyalkyloxycucurbituril may be a compound in which $R_1$ of Formula 1 is a 3-carboxybutylsulfanylpropyloxy group or a 3-carboxybutylsulfanyloxy group.

The carboxy groups present in the carboxyalkyloxycucurbituril may partially or wholly participate in the amide bond formation. The former case is represented in Formula 5a and the latter case is represented in Formula 5b.

In detail, the preparation of the compound of Formula 5a or 5b includes, but is not limited to, the steps of (a) adding 1-ethyl-3-(3-dimethylaminopropyl)carboimidehydrochloride and N-hydroxysuccinimide or N,N-dimethylacetamide to a solution of carboxy-ended cucurbituril in distilled dimethylformamide; (b) adding an amino-modified silica gel to the reaction mixture followed by stirring at room temperature for 12 hours or more; (c) washing the resultant silica gel with water and an organic solvent followed by drying to prepare a silica gel linked with cucurbituril by an amide bond.

The compound of Formula 5a or 5b may also be prepared as the following method.

3-aminopropyltriethoxysilane of Formula 3 where R is an ethoxy group, a is 3, and Y is $NH_2$ reacts with carboxyalkyloxycucurbituril of Formula 1 where $R_1$ is a carboxy-ended alkyloxy group of C2-C20 to form a silane-bonded cucurbituril via an amide bond. The silane-bonded cucurbituril is mixed with a silica gel of Formula 2a and heated in an organic solvent to prepare a silica gel linked with cucurbituril by an amide bond of Formula 5a or 5b. The organic solvent may be selected from various solvents such as benzene, toluene, and xylene and the heating temperature may be selected from 100 to 150° C. according to the type of the organic solvent.

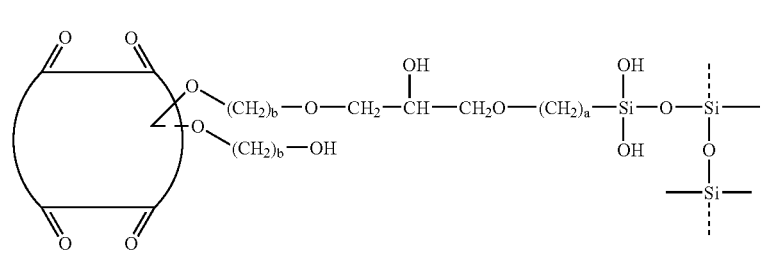

Formula 6a

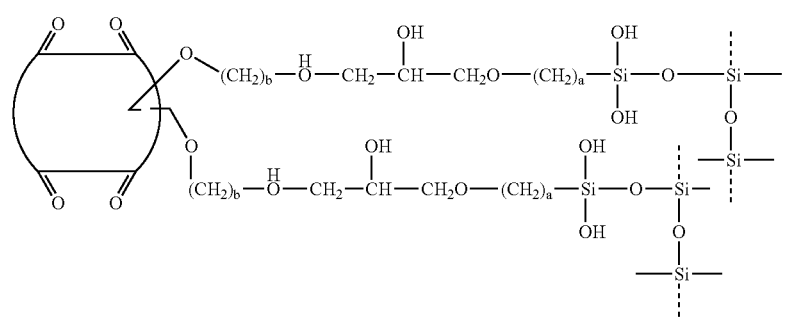

Formula 6b wherein a is an integer of 1 to 10, in particular, an integer of 3 to 8, and b is an integer of 2 to 20, in particular, an integer of 2 to 8.

The compounds of Formulae 6a and 6b may be prepared by ether bond formation between a cucurbituril derivative and a silica gel, in detail, by an nucleophilic substitution reaction between hydroxyalkyloxycucurbituril of Formula 1 where $R_1$ is a hydroxy-ended alkyloxy group of C2-C20 and an epoxy-modified silica gel. The hydroxy groups present in the hydroxyalkyloxycucurbituril may partially or wholly participate in the nucleophilic substitution reaction. The former case is represented in Formula 6a and the latter case is represented in Formula 6b.

The preparation of the compound of Formula 6a or 6b by nucleophilic substitution reaction includes the steps of (a) adding hydroxyalkyloxycucurbituril to a dimethylformamide solvent; (b) gradually adding an epoxy-modified silica gel and a catalytic amount of boron trichloride to the reaction mixture; (c) stirring the reaction mixture at room temperature for 1 to 24 hours followed by further stirring at about 60 to 100° C., in particular, at about 85° C., for 1 to 24 hours; and (d) washing the resultant silica gel with water and an organic solvent followed by drying to prepare a silica gel linked with cucurbituril via an ether bond.

The compound of Formula 6a or 6b may also be prepared as the following method.

3-glycidoxypropyltrimethoxysilane of Formula 3 where R is a methoxy group, a is 3, and Y is a glycidoxy group reacts with hydroxyalkyloxycucurbituril of Formula 1 where $R_1$ is a hydroxy-ended alkyloxy group of C2-C20 by a nucleophilic substitution reaction to form a silane-bonded curcurbituril via an ether bond. The silane-bonded cucurbituril is mixed with a silica gel of Formula 2a and heated in an organic solvent to prepare a silica gel linked with cucurbituril by an ether bond of Formula 6a or 6b. The organic solvent may be selected from various solvents such as benzene, toluene, and xylene and the heating temperature may be selected from 100 to 150° C. according to the type of the organic solvent.

noalkyloxycucurbituril may partially or wholly participate in the nucleophilic substitution reaction. The former case is represented in Formula 7a and the latter case is represented in Formula 7b.

The preparation of the compound of Formula 7a or 7b by the nucelophilic substitution reaction includes the steps of (a) dissolving aminoalkyloxycucurbituril in a phosphate buffer (pH 7 to 10); (b) adding an epoxy-modified silica gel to the reaction mixture; (c) stirring the reaction mixture at room temperature for 1 to 24 hours; and (d) washing the resultant silica gel with water and an organic solvent followed by drying to prepare a silica gel linked with cucurbituril by an amino bond.

The compound of Formula 7a or 7b may also be prepared as the following method.

3-glycidoxypropyltrimethoxysilane of Formula 3 where R is a methoxy group, a is 3, and Y is a glycidoxy group reacts with aminoalkyloxycucurbituril of Formula 1 where $R_1$ is an amino-ended alkyloxy group of C2-C20 by a nucleophilc substitution reaction to form a silange-bonded cucurbituril via an amino bond. The silane-bonded cucurbituril is mixed with a silica gel of Formula 2a and heated in an organic solvent to prepare a silica gel linked with cucurbituril by an amino bond of Formula 7a or 7b. The organic solvent may be selected from various solvents such as benzene, toluene, and xylene and the heating temperature may be selected from 100 to 150° C. according to the type of the organic solvent.

Preferably, a cucurbituril covalently bonded silica gel according to the present invention is further subjected to

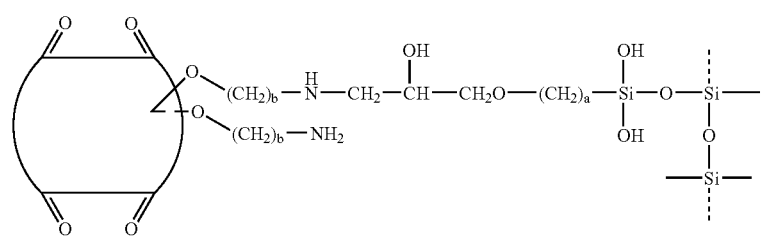

Formula 7a

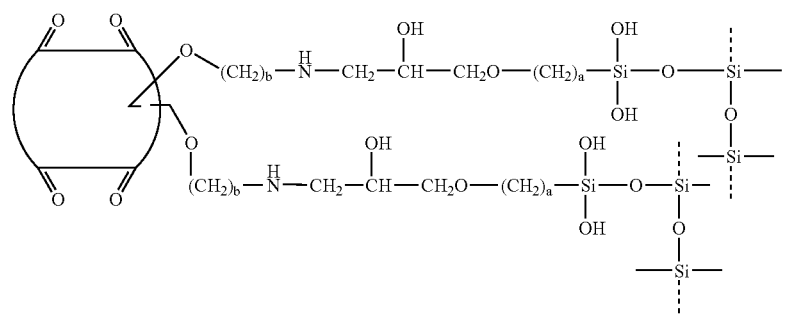

Formula 7b wherein a is an integer of 1 to 10, in particular, an integer of 3 to 8, and b is an integer of 2 to 20, in particular, an integer of 2 to 8.

The compounds of Formulae 7a and 7b may be prepared by amino bond formation between a cucurbituril derivative and a silica gel, in detail by a nucelophilic substitution reaction between aminoalkyloxycucurbituril of Formula 1 where $R_1$ is an amino-ended alkyloxy group of C1-C20 and an epoxy-modified silica gel. The amino groups present in the amidrying and purification after being sufficiently washed with water and an organic solvent to remove residual impurities.

The present invention also provides a silica gel bonded with both cucurbituril and cyclodextrin.

That is, the present invention provides a silica gel bonded with both cucurbituril and cyclodextrin in which the cucurbituril derivative of Formula 1 above and cyclodextrin of Formula 8 below are covalently bonded to the modified silica gel of Formula 2a above:

Formula 8

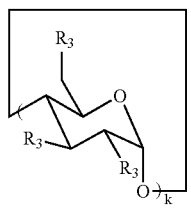 = 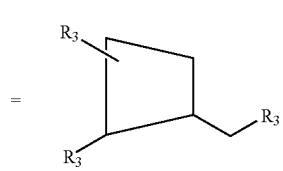

wherein k is an integer of 6 to 8 and $R_3$ is a hydroxy group or an alkenyloxy group with a substituted or unsubstituted alkenyl moiety of C1-C20, in particular, C1-C8.

The alkenyloxy group with a substituted or unsubstituted alkenyl moiety of C1-C20 may be an allyloxy group or a propylenyloxy group.

The cyclodextrin of Formula 8 may be alphacyclodextrin, betacyclodextrin, or gammacyclodextrin, which is unsubstituted or substituted with an end alkenyl group.

An alkenyloxy-ended cyclodextrin may be synthesized by alkylation between the cyclodextrin of Formula 8 where $R_3$ is a hydroxy group and alkenyl halide. The alkenyloxy group may be a propylenyloxy group or a butenyloxy group.

Examples of the silica gel bonded with both cucurbituril and cyclodextrin according to the present invention include compounds represented by Formulae 9a, 9b, 10a, and 10b below.

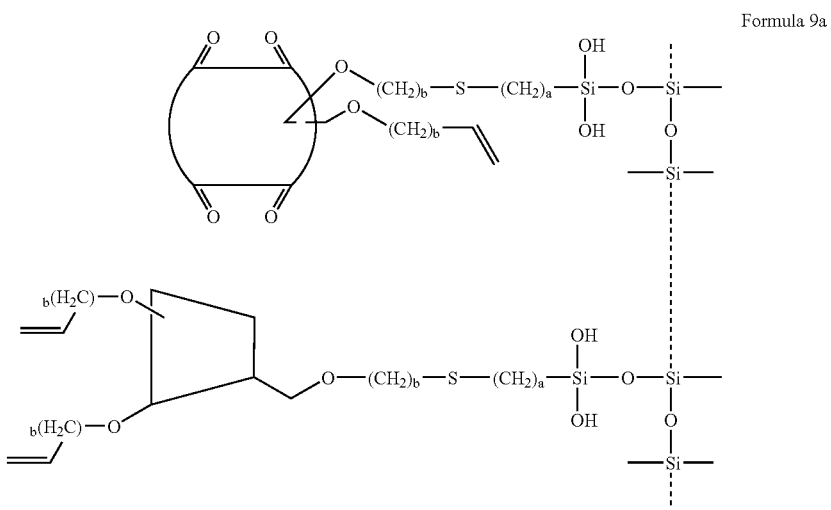

Formula 9a wherein a is an integer of 1 to 10, in particular, an integer of 3 to 8, and b is an integer of 2 to 20, in particular, an integer of 2 to 8.

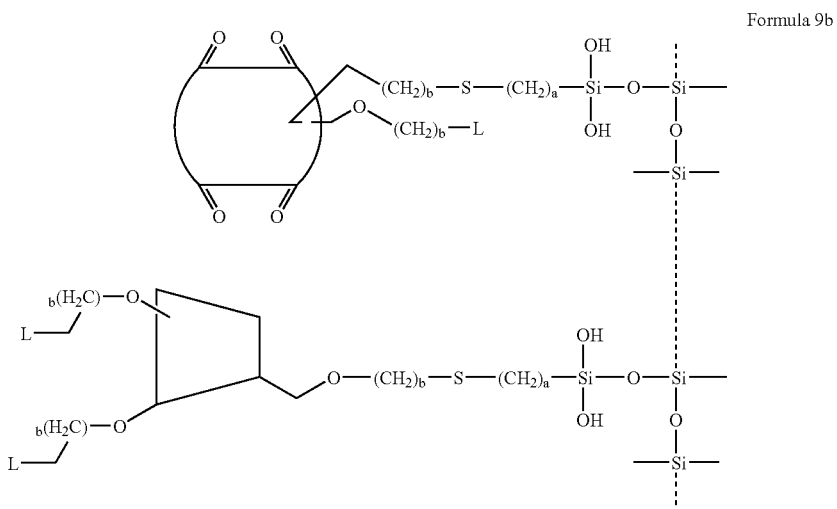

Formula 9b wherein

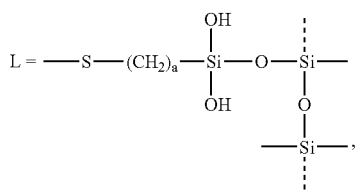

a is an integer of 1 to 10, in particular, an integer of 3 to 8, and b is an integer of 2 to 20, in particular, an integer of 2 to 8.

The compounds of Formulae 9a and 9b may be prepared by sulfido-bond formation of a cucurbituril derivative of Formula 1 and a cyclodextrin derivative of Formula 8 with a modified silica gel, in detail by radical reaction of a thiol-modified silica gel with allyloxycucurbituril and allylcyclodextrin. The radical reaction is as described above in the preparation of the compounds of Formulae 4a and 4b. The allyl groups present in each of the cucurbituril derivative and the cyclodextrin derivative may partially or wholly participate in the radical reaction. The former case is represented in Formula 9a and the later case is represented in Formula 9b.

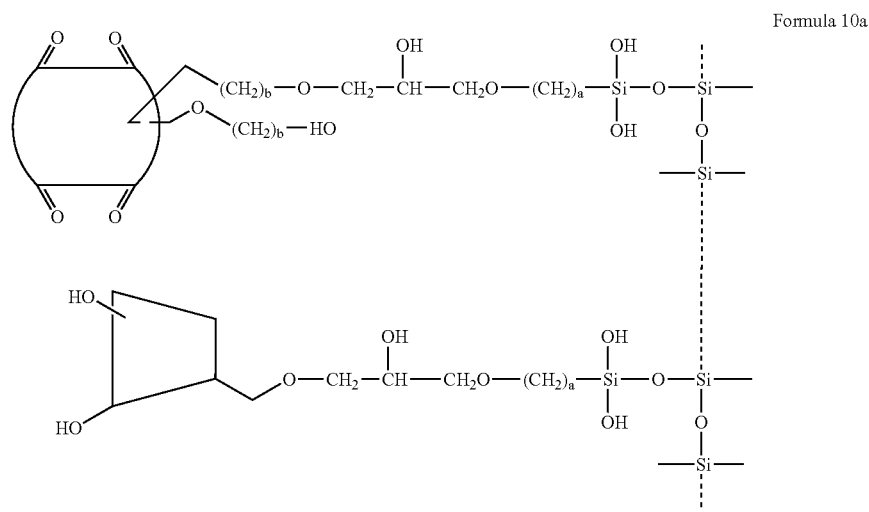

Formula 10a wherein a is an integer of 1 to 10, in particular, an integer of 3 to 8, and b is an integer of 2 to 20, in particular, an integer of 2 to 8.

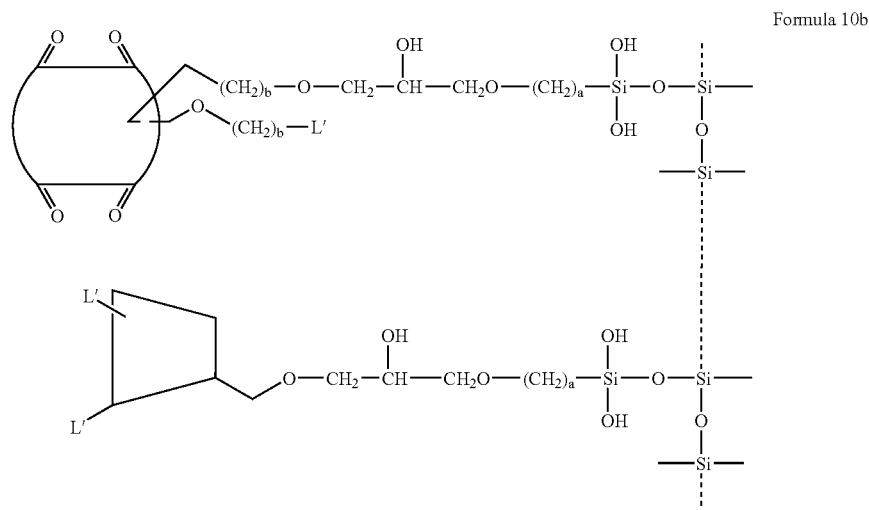

Formula 10b wherein a is an integer of 1 to 10, in particular, an integer of 3 to 8, b is an integer of 2 to 20, in particular, an integer of 2 to 8, and

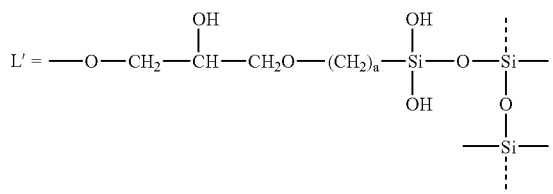

The compounds of Formulae 10a and 10b may be prepared by etherification of hydroxy-ended cucurbituril and cyclodextrin with an epoxy-modified silica gel such as a glycidoxypropyl silica gel in the presence of a catalytic a mount of boron trichloride, like in the preparation of the compounds of Formulae 6a and 6b. End hydroxy groups of cucurbituril and cyclodextrin may partially or wholly participate in the etherification. The former case is represented in Formula 10a and the latter case is represented in Formula 10b.

The present invention also provides a column packing material including the above-described cucurbituril-bonded silica gel and its use.

An organic solvent is added to a silica gel bonded with cucurbituril or cucurbituril and cyclodextrin to make a slurry, which is then packed in a steel tube. Then, the organic solvent is allowed to flow down through the steel tube for 1 to 2 hours. The steel tube is attached to a system for HPLC (High Performance Liquid Chromatography), CE (Capillary Electrophoresis), or CEC (Capillary Electrokinetic Chromatography) according to a separation purpose. The organic solvent that can be used may be acetonitrile, methanol, or a mixture thereof. The mixture ratio of acetonitrile to methanol may be in a range of 1:10 to 10:1. The steel tube may have an appropriate size according to a separation purpose. Preferably, a steel tube of 50 μm-5 mm in diameter and 1-10 cm in length is used for a micro-column and a steel tube of 0.5-2 cm in diameter and 5-20 cm in length is used for a common column. Preferably, the organic solvent is a mixture solvent to be used in compound separation and is allowed to flow down through the steel tube for about 2 hours or more before use. A silica gel covalently bonded with cucurbituril or cucurbituril and cyclodextrin can be effectively used for a column packing material or a filter.

In detail, the compounds of Formulae 4a, 4b, 5a, 5b, 6a, 6b, 7a, 7b, 9a, 9b, 10a, and 10b can be used for column packing materials in modern separation techniques such as HPLC, GC (Gas Chromatography), SFC (Supercritical Fluid Chromatography), CE, and CEC. Therefore, various compounds such as biologically important amino acids, alkaloids, proteins, nucleic acids, optically or non-optically active asymmetrical substances, drugs, ionic substances, amines, and gaseous compounds can be efficiently separated.

A column silica gel or a modified column silica gel is generally used as a stationary phase that is a column packing material in column chromatography.

A silica gel covalently bonded with cucurbituril or cucurbituril and cyclodextrin posses ring systems having good binding capability with organic molecules, metal ions, ionic substances, or biologically useful molecules, and thus, can be efficiently used in separation and purification of these compounds. That is, when a silica gel according to the present invention is used for a column packing material that is a stationary phase, the separation capability of the column for column chromatography is enhanced.

A silica gel covalently bonded with cucurbituril or cucurbituril and cyclodextrin according to the present invention can be efficiently used for a filter in removal of ecologically harmful water contaminants or air pollutants such as aromatic compounds, dyes, and heavy metal ions.

As used herein, a substituted or unsubstituted alkyl group of C1-C20 may be linear or branched, for example, methyl, ethyl, propyl, butyl, pentyl, octyl, or decyl, preferably, an alkyl group of C1-C12, and more preferably, an alkyl group of C1-C6. One or more of hydrogen atoms in the alkyl group may be substituted by a halogen atom, a hydroxy group, a cyano group, an amino group, or a nitro group.

EXAMPLES

Hereinafter, the present invention will be described more specifically by Examples. However, the following Examples are provided only for illustrations and thus the present invention is not limited to or by them.

Example 1

Synthesis of Silica Gel Linked with Cucurbituril by Sulfido-Bond 1 g of allyloxycucurbit[6]uril of Formula 1 where $R_1$ is an allyloxy group was dissolved in a mixed solution of chloroform and methanol (70:30) and then 2 g of a thiol-modified silica gel of Formula 2 where $R_2$ is a 3-mercaptopropyl group and 10 mg of AIBN (2,2-azobisisobutyronitrile) were added thereto. The reaction mixture underwent oxygen removal by the supply of nitrogen in a crystal tube and then exposed to ultraviolet light with a wavelength of about 300 nm for 3 days. After reaction termination, the resultant solution was sequentially washed with dimethylsulfoxide, dimethylformamide, chloroform, methanol, and acetone, and dried at 60° C. for 12 hours to give a silica gel linked with cucurbituril by a sulfido-bond of Formula 4a where each of a and b is 3.

$^{13}$C-CP MAS: δ=154.7, 134.1, 117.4, 98.4, 68.3, 52.6 29.0, 43.8, 35.0, 24.8, 13.5.

Example 2

Synthesis of Silica Gel Linked with Cucurbituril by Sulfido-Bond 1 g of allyloxycucurbit[6]uril of Formula 1 where $R_1$ is an allyloxy group was dissolved in a mixed solution of chloroform and methanol (70:30) and then 600 mL of 3-mercaptopropyltrimethoxysilane and 10 mg of AIBN were added thereto. The reaction mixture underwent oxygen removal by the supply of nitrogen in a crystal tube and then exposed to ultraviolet light with a wavelength of 300 nm for 2 days. After solvent evaporation under reduced pressure, 1.5 g of a dried silica gel of Formula 2a and 10 mL of toluene were added and then incubated 100° C. for 20 hours. After reaction termination, the resultant solution was washed with toluene, chloroform, methanol, acetone, or diethylether and then dried at 60° C. for 12 hours to give a silica gel linked with cucurbituril by a sulfido-bond of Formula 4a where each of a and bis 3.

$^{13}$C-CP MAS: δ=154.7, 134.1, 117.4, 98.4, 68.3, 52.6 29.0, 43.8, 35.0, 24.8, 13.5.

Example 3

Synthesis of Silica Gel Linked with Cucurbituril by Amide Bond 1 g of carboxymethylsulfanylpropyloxycucurbit[6]uril of Formula 1 where $R_1$ is a carboxymethylsulfanylpropyloxy group and n is 6 was dissolved in 50 mL of dimethylformamide, and then 150 mg of 1-ethyl-3-(3-dimethylaminopropyl)carbodiimide hydrochloride (EDAC) and 3 mg of N-hydroxysuccinimide were added thereto. 2 g of an amino-modified silica gel of Formula 2 where $R_2$ is a 3-aminopropyl group was then added to the reaction mixture and stirred at room temperature for 12 hours. After reaction termination, the resultant solution was sequentially washed with dimethylformamide, methanol, water, and acetone, and dried at 60° C. for 12 hours to give a silica gel linked with cucurbituril by an amide bond of Formula 5a where b is 3.

$^{13}$C-CP MAS: δ=176.4, 155.1, 98.6, 66.4, 44.1, 31.3, 23.7, 11.6.

Example 4

Synthesis of Silica Gel Linked with Cucurbituril by Amide Bond 1 g of carboxymethylsulfanylpropyloxycucurbit[6]uril of Formula 1 where $R_1$ is a carboxymethylsulfanylpropyloxy group and n is 6 was dissolved in 50 mL of dimethylformamide and then 150 mg of EDAC and 3 mg of N-hydroxysuccinimide were added thereto. 110 mL of 3-aminotriethoxysilane of Formula 3 where R is an ethyloxy group, n is 3, and X is $NH_2$ was added to the reaction mixture and stirred at room temperature for 12 hours. Then, 1.5 g of a dried silica gel was added to the reaction mixture and then stirred at 110° C. for 30 hours. After reaction termination, the resultant solution was sequentially washed with dimethylformamide, methanol, water, and acetone, and then dried at 60° C. for 12 hours to give a silica gel linked with cucurbituril by an amide bond of Formula 5a where b is 3.

$^{13}$C-CP MAS: δ=176.4, 155.1, 98.6, 66.4, 44.1, 31.3, 23.7, 11.6.

Example 5

Synthesis of Silica Gel Linked with Cucurbituril by Ether Bond 1 g of 2-hydroxyethyloxycucurbituril of Formula 1 where $R_1$ is a 2-hydroxyethyloxy group and a 2 g of glycidoxypropyl silica gel of Formula 2 where $R_2$ is a glycidoxypropyl group were dissolved in 40 mL of dimethylformamide and then a catalytic amount of boron trichloride ($BF_3 \cdot Et_2O$) was added thereto. The reaction mixture was stirred at room temperature for 2 hours and then at 85° C. for 12 hours. After reaction termination, the resultant solution was sequentially washed with dimethylformamide, chloroform, methanol, water, and acetone, and dried at 60° C. for 12 hours to give a silica gel linked with cucurbituril by an ether bond of Formula 6a where a is 3 and b is 2.

$^{13}$C-CP MAS: δ=156.3, 96.5, 74.4, 68.3, 52.0, 46.1, 39.5, 23.6, 9.1.

Example 6

Synthesis of Silica Gel Linked with Cucurbituril by Amino Bond 1 g of 2-aminoethyloxycucurbit[6]uril of Formula 1 where $R_1$ is a 2-aminoethyloxy group and 2 g of a glycidoxypropyl silica gel of Formula 2 where $R_2$ is a glycidoxypropyl group were dissolved in 2 g of a phosphate buffer solution (pH 8.8) and stirred for 12 hours. After reaction termination, the silica gel was recovered by filtration. A 10 mL solution of 0.2N HCl was then added to the silica gel and stirred for 30 minutes. The silica gel was sequentially washed with water, acetone, and methanol and dried at 60° C. for 12 hours to give a silica gel linked with cucurbituril by an amino bond of Formula 7a where a is 3 and b is 2.

Example 7

Synthesis of Silica Gel Linked with Cucurbituril and Cyclodextrin by Sulfido-Bond A silica gel linked with cucurbit[6]uril and cyclodextrin by a sulfido-bond of Formula 9a where a is 3 and b is 3 was synthesized in the same manner as in Example 1 except that allyloxycucurbituril of Formula 1 where $R_1$ is an allyloxy group and 2,3,6,-allyloxy-β-cyclodextrin were dissolved in 200 mL of a mixed solution of chloroform and methanol (30:70) and then 4 g of a 3-mercaptopropyl silica gel of Formula 2 where $R_2$ is a 3-mercaptopropyl group was added thereto.

$^{13}$C-CP MAS: δ=154.0, 136.4, 117.0, 101.4, 97.4, 87.5, 82.1, 72.8, 42.4, 37.6, 32.2, 24.4, 13.0.

Example 8

Synthesis of Silica Gel Linked with Cucurbituril and Cyclodextrin by Ether Bond

A silica gel linked with cucurbituril and cyclodextrin by an ether bond of Formula 10a where a is 3 and b is 2 was synthesized in the same manner as in Example 3 except that 1 g of 2-hydroxyehtyloxycucurbit[6]uril of Formula 1 where $R_1$ is a 2-hydroxyethyloxy group, 1 g of β-cyclodextrin, and 1 g of a glycidoxypropyl silica gel of Formula 2 where $R_2$ is a glycidoxypropyl group were used.

$^{13}$C-CP MAS: δ=156.4, 103.2, 85.0, 81.6, 79.4, 77.1, 74.4, 68.3, 52.0, 46.1, 39.5, 23.6, 9.1.

Application Example 1

Preparation of HPLC Column Tube

Methanol was added to the silica gel linked with cucurbituril by a sulfido-bond of Formula 4a according to Example 2 to make a slurry and then packed in a steel tube of 10 cm in length and 4.5 cm in diameter. Then, methanol was allowed to flow down through the steel tube for 1 hour. The steel tube thus prepared can be used to separate a compound of interest using an appropriate solvent after attached to a HPLC system.

Application Example 2

Separation of Amino Acids

After the steel tube according to Application Example 2 was attached to a HPLC system, a mixed solvent of acetonitrile and water (3:7, by volume) as an eluent was allowed to flow down through the steel tube for 2 hours. A mixed solution of tryptophan, phenylalanine, and tyrosine was injected into the eluent at a flow rate of 1 mL/min. Chromatographic signals corresponding to fractions of tryptophan, tyrosine, and phenylalanine were respectively observed at 4 minutes 40 seconds, 6 minutes 20 seconds, and 8 minutes 35 seconds by a UV detector at about 214 nm, and such separation results for the three amino acids are shown in FIG. 1.

While the above Examples has been particularly shown and described in terms of only specific bonds between cucurbituril/cyclodextrin and a silica gel, it will be understood by those of ordinary skill in the art that synthesis of a silica gel linked with cucurbituril or cucurbituril and cyclodextrin is possible by various types of bonds.

Unlike a simple mixture of cucurbituril, cyclodextrin, and the like, a silica gel covalently bonded with cucurbituril and/or cyclodextrin according to the present invention enables recycling of a silica gel as a solid support containing a constant content of cucurbituril due to the covalent bond. The cucurbituril and cyclodextrin are not dissolved in a stationary phase, and thus, easily separated. Furthermore, the silica gel has selective separation capability for various test samples because it can have various types of covalent bond lengths and various types of functional groups which participate in the covalent bonds. Therefore, a solid phase such as a silica gel bonded with cucurbituril or cucurbituril and cyclodextrin can be used for various types of stationary column packing materials in separation and purification technologies or filters in removal of various contaminants.

What is claimed is:

1. A cucurbituril-bonded silica gel selected from compounds represented by Formulae 4a, 5a, 6a, and 7a:

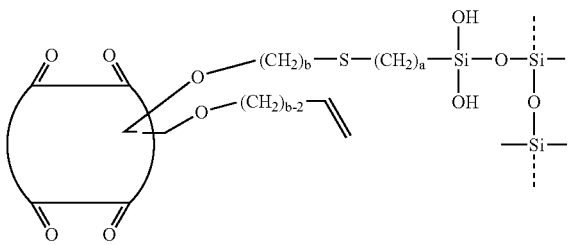

(4a)

wherein a is an integer of 1 to 10 and b is an integer of 2 to 20;

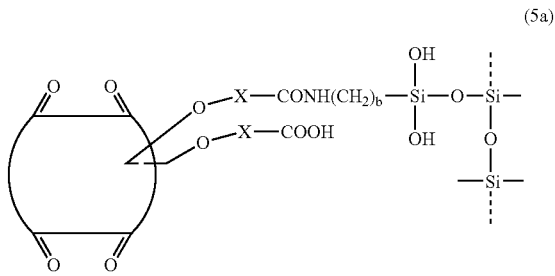

(5a)

wherein b is an integer of 2 to 20, X is an alkylsulfidoalkylene group with a substituted or unsubstituted alkyl moiety of C2-C20 or a substituted or unsubstituted alkylene group of C2-C20;

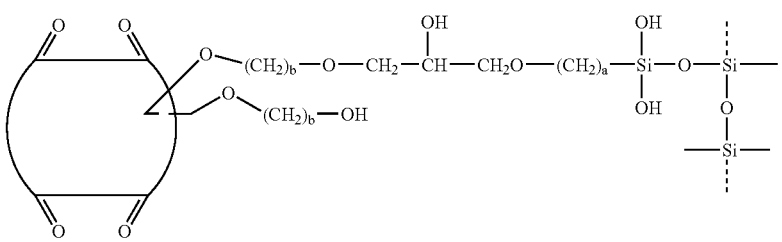

(6a)

wherein a is an integer of 1 to 10 and b is an integer of 2 to 20; and
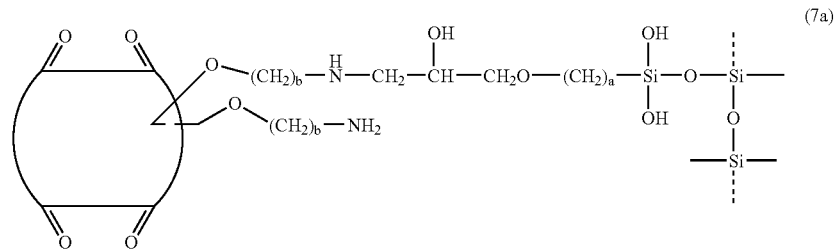
wherein a is an integer of 1 to 10 and b is an integer of 2 to 20.
2. A column packing material comprising the cucurbituril-bonded silica gel of claim 1.
3. A filter comprising the cucurbituril-bonded silica gel of claim 1.
* * * * *